(12) United States Patent
Gill et al.

(10) Patent No.: US 7,987,264 B1
(45) Date of Patent: Jul. 26, 2011

(54) TESTING POLICIES IN A NETWORK

(75) Inventors: Monty S. Gill, San Jose, CA (US); Roger A. Chickering, Granite Bay, CA (US); Charles A. Bering, Jr., San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1004 days.

(21) Appl. No.: 11/340,512

(22) Filed: Jan. 27, 2006

(51) Int. Cl.
*G06F 15/173* (2006.01)
*G06F 15/16* (2006.01)
*G06F 15/177* (2006.01)
*G06F 17/00* (2006.01)
*H04L 12/56* (2006.01)
*H04L 12/28* (2006.01)

(52) U.S. Cl. ............ 709/225; 709/217; 709/221; 726/1; 370/392

(58) Field of Classification Search .................. 709/221, 709/217, 225; 726/1; 370/392
See application file for complete search history.

(56) References Cited

U.S. PATENT DOCUMENTS

| | | | |
|---|---|---|---|
| 6,381,639 B1* | 4/2002 | Thebaut et al. ................ 709/222 |
| 2003/0046396 A1* | 3/2003 | Richter et al. ................. 709/226 |
| 2004/0103315 A1* | 5/2004 | Cooper et al. ................. 713/201 |
| 2004/0221177 A1* | 11/2004 | Koops ............................ 713/201 |
| 2007/0157288 A1* | 7/2007 | Lim .................................. 726/1 |

* cited by examiner

*Primary Examiner* — Nathan Flynn
*Assistant Examiner* — Nicholas Jensen
(74) *Attorney, Agent, or Firm* — Harrity & Harrity, LLP

(57) ABSTRACT

A device may include first logic configured to receive a data unit and to receive a network policy. The device may include second logic configured to identify how the data unit will be handled by the network policy and to generate a result that includes information about how the data unit will be handled by the network policy.

20 Claims, 6 Drawing Sheets

TESTING POLICIES IN A NETWORK

BACKGROUND OF THE INVENTION

A. Field of the Invention

The principles of the invention relate generally to network device management and, more particularly, to testing network policies.

B. Description of Related Art

Network policies may be used to identify which client devices are allowed to communicate with certain destination devices in a network. For example, a network policy may identify that a client device, operated by an employee, is allowed to access a server containing employee benefits information on a corporate network.

Network policies may need to be changed and/or updated periodically as network configurations change and/or as client devices and destinations are added or removed from the network. When network policies are changed, errors may occur. For example, assume that a network administrator would like to add or reconfigure a new network device, such as a firewall. The network administrator may configure the device by setting various policies, such as policies defining which users are allowed to access which resources. When finished, the network administrator may turn the policies "on." If the policies were not configured correctly, however, the firewall may block users from accessing resources that the users should be able to access and/or allow other users access to resources that they should not be allowed to access.

SUMMARY OF THE INVENTION

One aspect is directed to a method for testing a network policy. The method may include receiving the network policy, receiving network traffic, and generating a result that indicates how the network traffic would have been handled by the network policy.

Yet another aspect is directed to a device. The device may include first logic configured to receive a data unit and to receive a network policy. The device may include second logic configured to identify how the data unit will be handled by the network policy and to generate a result that includes information about how the data unit will be handled by the network policy.

Still another aspect is directed to a device. The device may include first logic configured to store policies relating to network traffic received by the device. The device may include second logic configured to operate the device in an operational mode in which the stored policies are applied to the network traffic and to enforce the applied policies upon the network traffic. The device may include third logic configured to operate the device in a test mode in which the stored policies are applied to the network traffic but not enforced upon the network traffic.

Yet another aspect is directed to a device. The device may include means for receiving a network policy and means for receiving a data unit. The device may include means for identifying a destination device based on information in the data unit and means for processing the data unit based on the network policy. The device may include means for generating a test log that indicates how the data unit will be handled when the network policy is enforced. The device may include means for sending the data unit to the destination device and means for sending the test log to a device on a network.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Implementations of the invention may allow the testing of network policies using a network device, such as a router. Network policies may be evaluated prior to implementing the network policies in an operational environment. Network policies may be tested using the types of traffic that the network device will be exposed to when the network device and network policies are implemented in the operational environment. Network policy performance can be evaluated and modified using techniques consistent with the principles of the invention before implementing the network policies in the operational environment.

As used herein, "live" refers to traffic that passes through networks and/or network devices during normal operations of the networks and/or network devices. For example, live traffic may pass from a client device to an e-commerce server during an online purchasing transaction. In contrast, "test traffic" refers to traffic that passes through a network and/or network device during testing of the network or network device. Test traffic may include the same types of traffic (e.g., live traffic) that the network and/or network device may encounter when operating in the operational environment.

A "data unit," as used herein, may refer to any type of machine-readable data having substantially any format that may be adapted for use in one or more networks, such as a public network and/or private network. A data unit may include packet data and/or non-packet data. A data unit may include source information that identifies a source device, e.g., a device that sent the data unit, and the data unit may include destination information that identifies a destination device, e.g., a device that is to receive the data unit.

Exemplary System Overview

Figure 1:
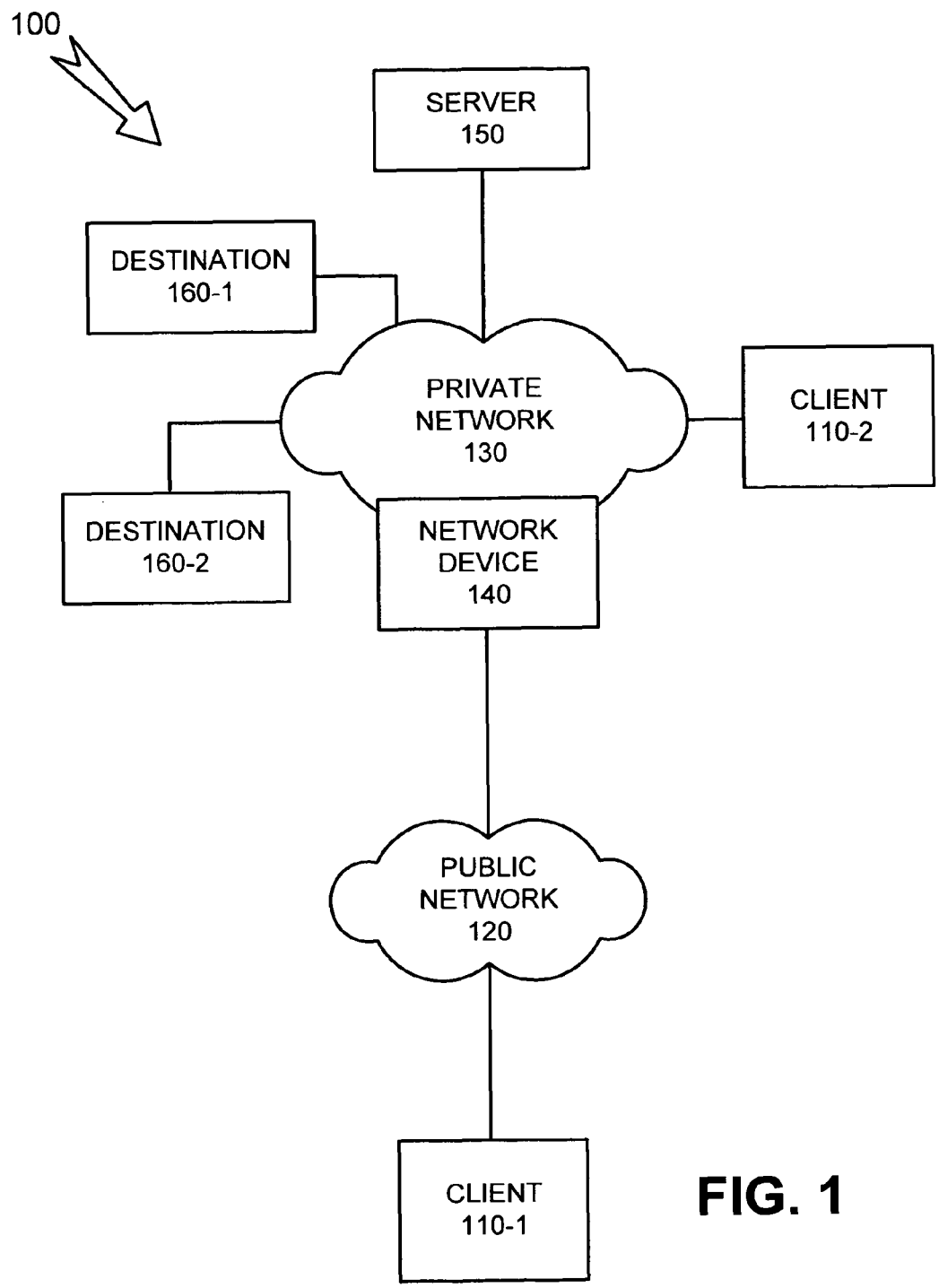
FIG. 1 is an exemplary diagram of a system in which concepts consistent with the principles of the invention may be implemented.

FIG. 1 is an exemplary diagram of a system 100 in which concepts consistent with the principles of the invention may be implemented. System 100 may include multiple entities, such as clients 110-1 and 110-2 (collectively client 110), public network 120, private network 130, network device 140, server 150 and destination devices 160-1 and 160-2 (collectively destination 160).

While system 100 is shown to include a particular number and arrangement of elements, system 100 may include fewer, more, different, or differently arranged elements in other implementations consistent with the principles of the invention. In addition, system 100 may include the illustrated elements, and other elements, in alternative configurations consistent with the principles of the invention. For example, network device 140 may be located between client 110-1 and public network 120.

Client 110 may include a device configured to send a data unit to a network and/or to receive a data unit from a network. Client 110 may be associated with a person, such as a user. For example, clients 110-1 and 110-2 may represent users of services provided by server 150. Client 110 may include a desktop computer, a laptop computer, a personal digital assistant (PDA), a web enabled cellular telephone, a wireless fidelity (Wi-Fi) device, or an application specific processing device that is operated by a user to communicate with a destination device, such as server 150 or destinations 160. Client 110 may communicate with other devices, such as other clients, network device 140 and/or server 150, by sending, for example, data units, such as packets.

Implementations may include client 110-1 that accesses devices on private network 130 via a public network 120. In one implementation, client 110-1 may use a secure socket layer virtual private network (SSL-VPN) tunnel to establish a secure communication channel into private network 130. In contrast, client 110-2 may operate on private network 130 without passing traffic through public network 120. For example, client 110-2 may be located within a secure corporate network, such as a corporate local area network (LAN).

Public network 120 may include a network, or combination of networks, capable of transporting data units. For example, public network 120 may include a LAN, a metropolitan area network (MAN), or a wide area network (WAN), such as the Internet. Public network 120 may include hardwired connections, such as shielded twisted pairs, coaxial cables, optical fibers, and/or waveguides. Alternatively, public network 120 may include wireless links, such as free space optical links, and/or free space acoustic links. Public network 120 may operate using substantially any protocol, such as asynchronous transfer mode (ATM), synchronous optical transport (SONET), Internet Protocol (IP), public switched telephone network (PSTN), or Bluetooth. Public network 120 may be an insecure network, such as the Internet.

Private network 130 may be similar in operation to public network 120. Implementations of private network 130 may be configured as a secure network. Private network 130 may use one or more network policies to provide devices, such as client 110-2, with access to other devices operating on private network 130, such as server 150 or destinations 160-1 and 160-2.

Network device 140 may include a device capable of receiving a data unit via a network. In one implementation, network device 140 may include an in-line device operating as an edge device between a first network and a destination device that may be operating on a second network. For example, network device 140 may operate as an edge device between an untrusted network, such as the Internet, and a trusted network, such as a corporate LAN. "Inline network device" may refer to any network device operating in a manner whereby all, or substantially all, data units intended for a destination device pass through the network device before reaching the destination device. Network device 140 may be configured to enforce one or more network policies on behalf of a network management device, such as server 150, on private network 130.

Network device 140 may include devices such as routers, gateways, firewalls, switches, and/or servers. For example, network device 140 may operate as a router in cooperation with server 150 to provide communication services to a number of authorized subscribers, such as clients 110-1 and 110-2.

Server 150 may include a device capable of receiving a data unit from another device or from a network. For example, server 150 may include a workstation, desktop computer, laptop computer, PDA, web enabled cellular telephone, Wi-Fi device, or an application specific processing device. In exemplary implementations described herein, server 150 may operate as a policy server. For example, server 150 may be configured to establish network policies, such as network access policies, that can be enforced by network device 140 consistent with the principles of the invention.

In one implementation, server 150 may execute a network management application to implement one or more network policies. The network management application may be used to manage network devices, such as network device 140. For example, the network management application may be used to create and/or implement network policies that can be used to grant permissions, such as access permissions, to devices operating on private network 130.

Assume that client 110-2 desires to communicate with destination 160-1. Server 150 may operate a network management application that provides a network policy to network device 140. The network policy may indicate that client 110-2 is allowed to communicate with destination 160-1.

Network policies may be configured to allow a source device to access a portion of a destination, such as a directory or an application, or to access all information on a destination, such as all files on a hard drive. One of ordinary skill in the art will recognize that other devices can be managed using network management applications consistent with the principles of the invention. A network management application may communicate with each of the network devices it is managing and may present a user interface through which an administrator can control and monitor the controlled devices.

Exemplary Device Architecture

Figure 2:
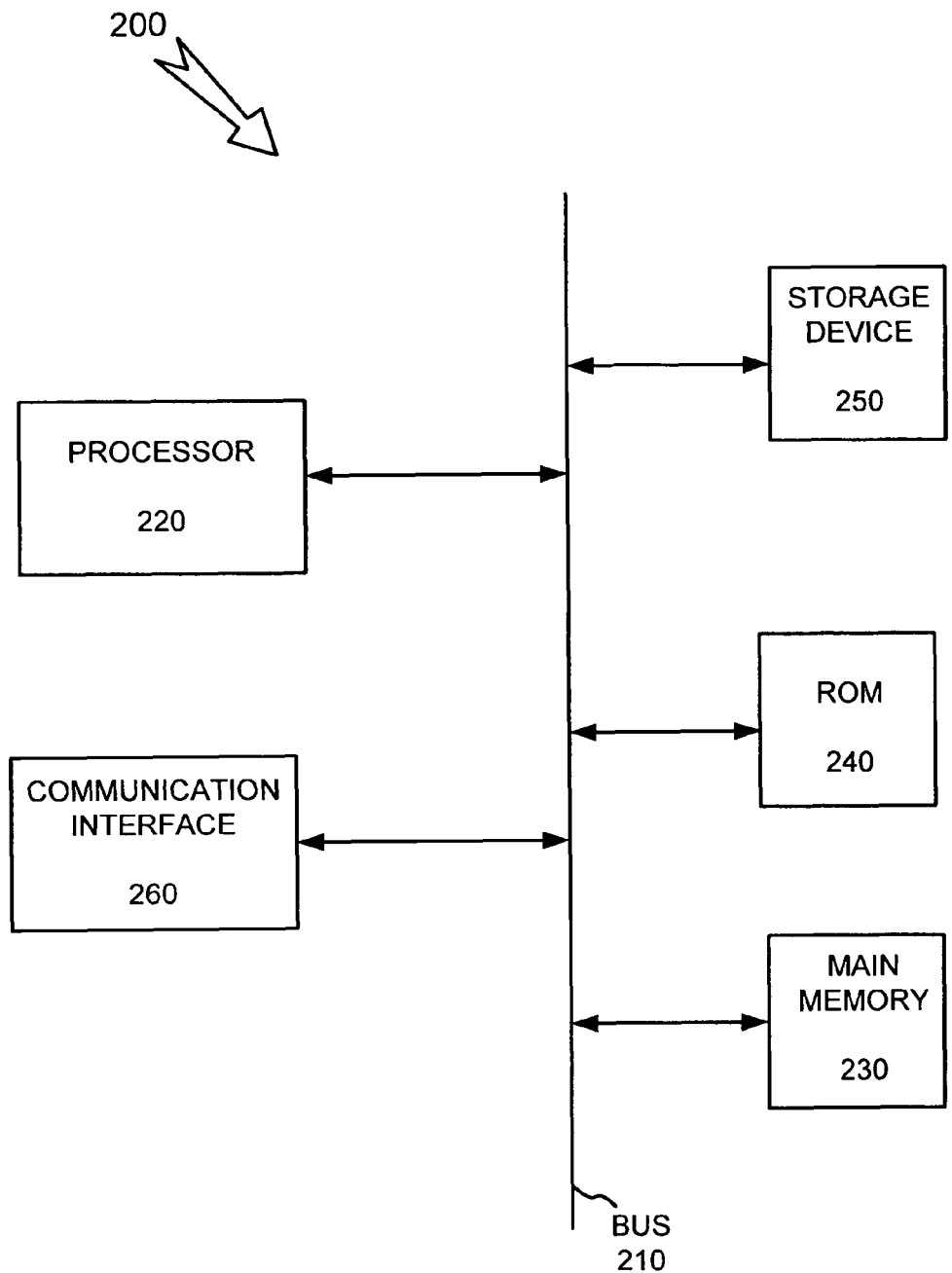
FIG. 2 is an exemplary diagram of a client, destination, server, or other network device, such as a firewall or a router.

FIG. 2 is an exemplary diagram of a computer device 200, which may represent one of clients 110, network device 140, server 150, or destinations 160. Computing device 200 may include a bus 210, a processor 220, a main memory 230, a read only memory (ROM) 240, a storage device 250, and a communication interface 260. Processor 220 may include processors, microprocessors, or processing logic that interpret and execute instructions. Main memory 230 may include a random access memory (RAM) or another type of dynamic storage device that stores information and instructions for execution by processor 220. ROM 240 may include a ROM device or another type of static storage device that stores static information and instructions for use by processor 220. Storage device 250 may include a magnetic and/or optical recording medium and its corresponding drive.

Communication interface 260 may include any transceiver-like mechanism that enables computing device 200 to communicate with other devices and/or systems. For example, communication interface 260 may include mechanisms for communicating with another device or system via a network, such as private network 130.

Computing device 200 may implement a number of functions, described in more detail below, using software instructions read into memory 230 from another computer-readable medium, such as storage device 250, or from another device via communication interface 260. The software instructions contained in memory 230 may cause processor 220 to perform processes that will be described later. More particularly, as mentioned above, the software instructions contained in memory 230 may implement a network management application that can be used to implement network policies for private network 130. Alternatively, hardwired circuitry or other logic may be used in place of, or in combination with, software instructions to implement processes consistent with the invention. Thus, implementations consistent with the principles of the invention are not limited to any specific combination of hardware circuitry and software.

Functional Diagram of a Network Device

Figure 3:
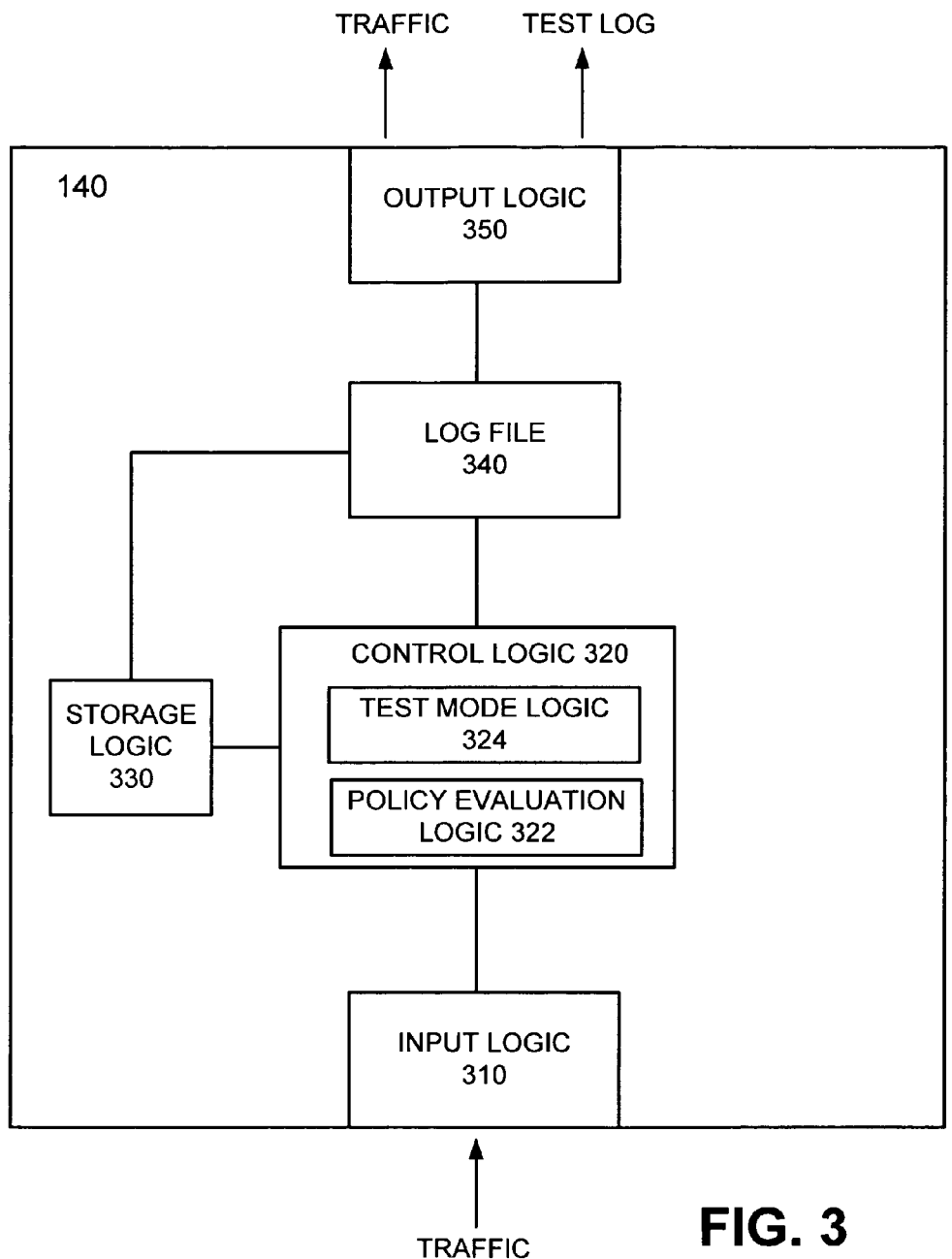
FIG. 3 is a functional diagram showing network device logic that can be used to generate log files during network device testing consistent with the principles of the invention.

FIG. 3 is a functional diagram showing network device logic that can be used to generate log files during network device testing consistent with the principles of the invention. The functional diagram of FIG. 3 may include input logic 310, control logic 320, policy evaluation logic 322, test mode logic 324, storage logic 330, log file 340 and output logic 350.

Input logic 310 may be configured to receive incoming traffic. In one implementation, input logic 310 may be implemented in communication interface 260. Input logic 310 may receive incoming traffic when network device 140 is operating in an operational mode and/or when network device 140 is operating in a test mode. In an operational mode, network traffic is handled based on policy settings in control logic 320. In contrast, in a test mode, network policies are implemented but traffic is not affected.

Control logic 320 may be implemented via processor 220 and may perform processing operations on traffic consistent with the principles of the invention. In one implementation, control logic 320 may include policy implementation logic 322 (hereinafter policy logic 322) and test mode logic 324.

Policy logic 322 may include logic that causes network device 140 to implement policies configured by an administrator. For example, when network device 140 is in an operational mode, policy logic 322 may evaluate a policy and may determine if the policy should be applied to incoming traffic. Incoming traffic may be passed on to a destination, rejected, dropped, etc., based on policies implemented by policy logic 322 when network device 140 operates in an operational mode. For example, a data unit may be passed to a destination if the policy indicates that a source is authorized to communicate with the destination.

Test mode logic 324 may include logic that causes policies to be implemented but to not affect traffic passing through network device 140. Test mode logic 324 may cause input logic 310 to send traffic to a destination regardless of whether a policy indicates that a source is authorized to communicate with a destination. Test mode logic 324 may further generate a test log that indicates how the traffic would have been handled if the tested policy were operational.

Storage logic 330 may be implemented in main memory 230, ROM 240 and/or storage device 250. In one implementation, storage logic 330 may include logic that stores instructions, traffic, and/or results generated by test mode logic 324 when network device 140 operates on traffic in a test mode. For example, storage logic 330 may be configured to store log file 340 and policies that are applied to incoming traffic when network device 140 is operating in an operational mode or in a test mode.

Log file 340 may include a data structure that can be created by test mode logic 324 and/or storage logic 330. For example, control logic 320 may implement test mode logic 324 to create log file 340. Test mode logic 324 may populate log file 340 with results that indicate how the incoming traffic will be handled when network device 140 is operating in an operational mode, i.e., if network device 140 was implementing the tested network policy on incoming traffic. Log file 340 may include information in machine and/or human readable form.

Output logic 350 may be configured to send traffic and/or test logs to a destination, such as server 150. For example, output logic 350 may be configured to send a test log, such as log file 340, to a network administrator and/or test engineer when network device 140 operates in a test mode. Output logic 350 may also be configured to send traffic to destinations when network device 140 is in an operational mode (e.g., sending traffic to authorized destinations from an authorized source) or in a test mode (e.g., sending traffic to destinations even if a source is not authorized). In one implementation, output logic 350 may be implemented via communication interface 260.

Exemplary Data Structure

Figure 4:
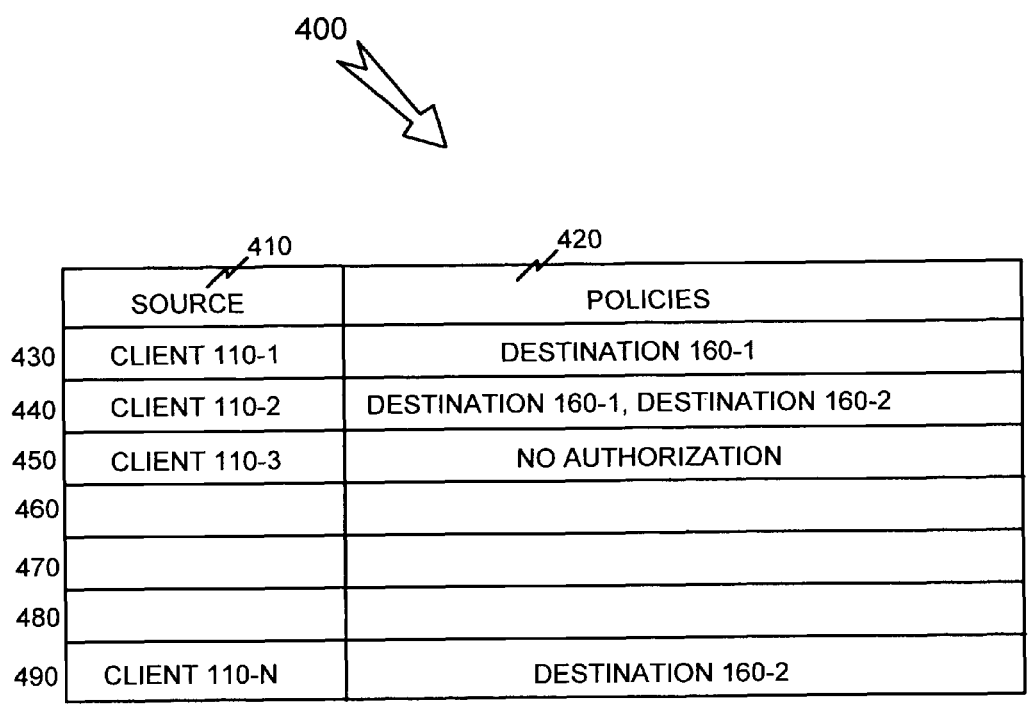
FIG. 4 is a diagram illustrating a data structure that can be used to establish network policies for a network device consistent with the principles of the invention.

FIG. 4 is a diagram illustrating a data structure that can be used to store network policies for network device 140 consistent with the principles of the invention. Data structure 400 may include a source identifier 410 and network policies 420. Information in data structure 400 may be arranged as a number of entries 430-490 in a row by column format to facilitate providing the information in to an administrator in an organized manner.

Information in data structure 400 may be used to establish network policies for devices operating with private network 130. For example, a network policy can determine if a source, such as client 110-2, is allowed to communicate with a destination, such as destination 160-1.

Source identifier 410 may include information that identifies a source device that may send traffic to network device 140 when attempting to communicate with a device on private network 130. Source identifier 410 may identify sources by addresses, such as an Internet address, user names, geographic identifiers, such as an office number, passwords, device names, etc., consistent with the principles of the invention.

Policy 420 may include information that identifies one or more destinations with which a source is authorized to communicate. Information included in policy 420 may correspond to each source and may identify a destination that each source can access and/or may identify a portion of a destination (e.g., a directory or file) that each source can access. Policy 420 may include other policy related information for each client 110, such as an identifier of the security software that client 110 must be running before client 110 is allowed to access devices on private network 130. Policy 420 may include device addresses, device or user names, device or user locations, etc., consistent with the principles of the invention. A source may be prevented from communicating with a destination if the source is not authorized for that destination. For example, network device 140 may drop data units received from a source that does not have permission to communicate with a certain destination.

Data structure 400 may hold information for substantially any number of clients 110. Implementations of data structure 400 may include other information consistent with the principles of the invention. For example, data structure 400 may include time parameters that identify a time period for which a source is authorized to access a destination, parameters that identify authorized links over which a source is allowed send authorized traffic, parameters that identify an owner of a source, etc. Data structure 400 may be stored via storage logic 330 on network device 140.

Exemplary Log File

Figure 5:
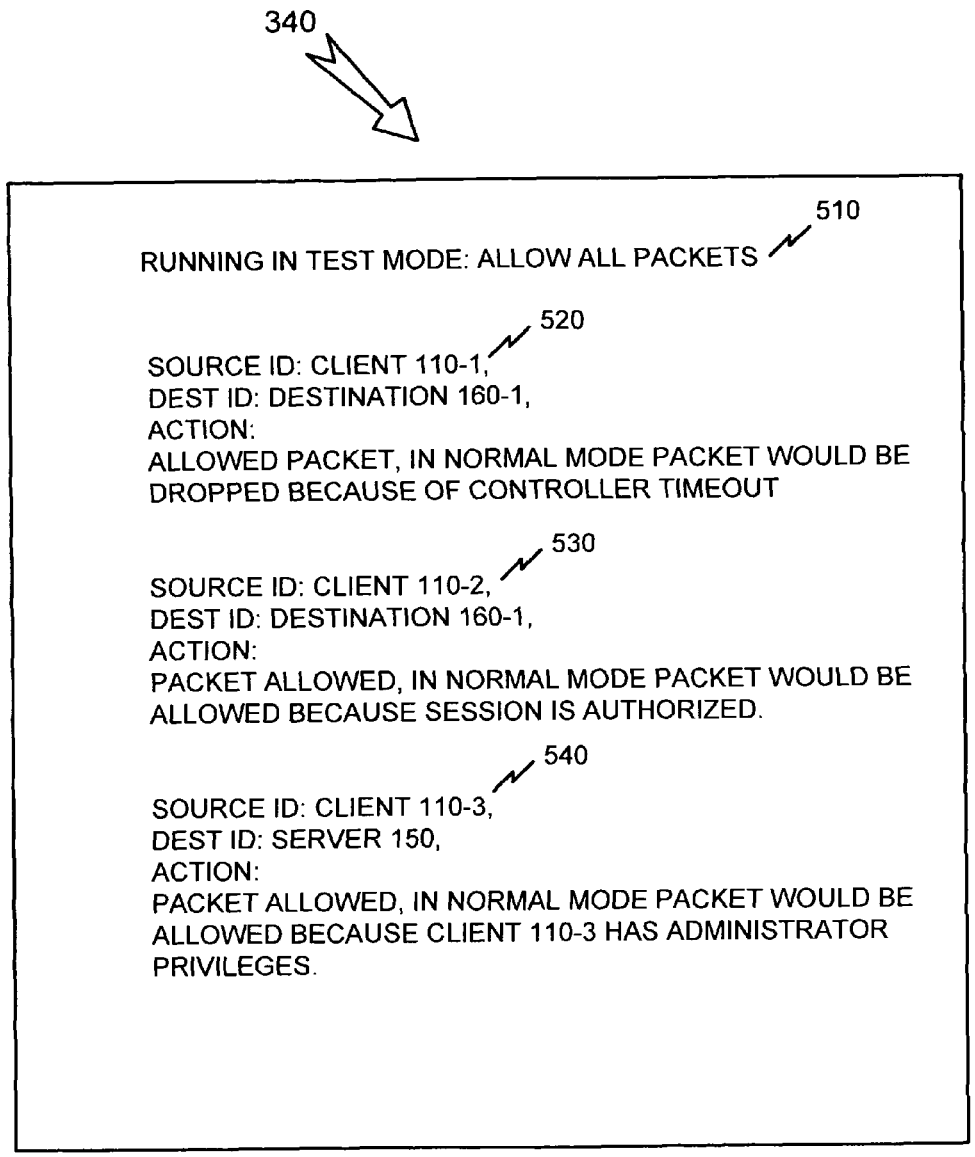
FIG. 5 illustrates an exemplary log file that can be generated by a network device when operating in a test mode consistent with the principles of the invention.

FIG. 5 illustrates an exemplary log file that can be generated by network device 140 when operating in a test mode consistent with the principles of the invention. For example, log file 340 may be generated by test mode logic 324 when network device 140 operates in a test mode. Assume that one or more network policies are generated and/or updated via server 150. The network policies may be stored in data structure 400 and sent to network device 140. Network device 140 may use data structure 400 when operating in a test mode or an operational mode against incoming traffic. For example, network device 140 may use source identifier 410 and policy 420 to operate on incoming test traffic. Network device 140 may determine if the network policies produce desired outcomes, such as allowing a known source to access a destination that the source is authorized to access.

Log file 340 may include a title 510 and test results 520-540. Title 510 may include information that informs an administrator or another device that log file 340 includes test mode information. Title 510 may also include time and/or date information that can be used to identify when log file 340 was created and/or when network device testing was performed.

Log file 340 may include test results 520, 530, 540 that can include information that identifies a source device, an intended destination, and an action performed by network device 140. For example, result 520 may indicate that client 110-1 attempted to contact destination 160-1. Result 520 may also indicate that network device 140 allowed a packet to pass through network device 140 to destination 160-1 in test mode, but that network device 140 would have dropped a packet received from client 110-1 during normal operation because of a controller timeout. An administrator may be able to correct the timeout issue after reviewing log file 340.

Implementations of log file 340 have been described using a limited number parameters and/or information in connection with title 510 and results 520-540. Other implementations of log file 340 may include substantially any type of information that may be useful for diagnosing the performance of network device 140 in connection with one or more network policies. For example, implementations of log file 340 may include descriptions of actions performed by network device 140, such as a description that a timeout error was connected to an "open" or "closed" action, information about network policy identifiers, information about links over which packets were received and/or would traverse en route to a destination, information about the presence or absence of authorizations in a tested network policy for source devices or destinations devices, descriptions of responses that network device 140 will send to a source device during normal operation based on a configuration of a tested network policy (e.g., "access denied"), etc.

Figure 6:
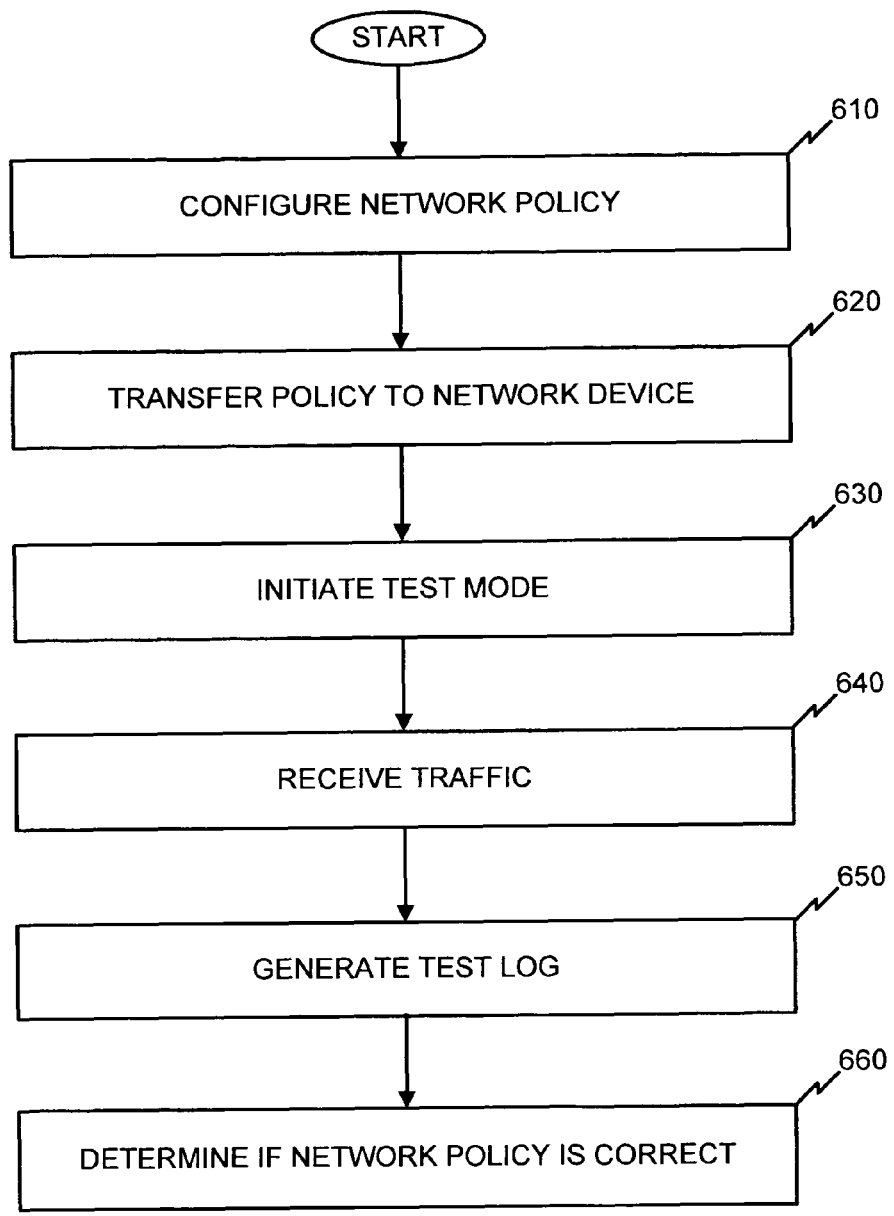
FIG. 6 is a flowchart illustrating an exemplary process for testing network device 140 consistent with the principles of the invention.

"Packet," as used in connection with FIGS. 5 and 6, is representative of a type of data unit that can be used with an implementation of the invention. Implementations, such as those discussed in connection with FIGS. 5 and 6, may also operate on other types of data units, such as cells, consistent with the principles of the invention.

Exemplary Process

FIG. 6 is a flowchart illustrating an exemplary process for testing network device 140 consistent with the principles of the invention. A network policy may be configured (act 610). For example, an administrator may generate data structure 400 that includes one or more network policies for devices operating on a network, such as private network 130. A network policy may identify sources, such as clients 110-1 and 110-2, via source identifier 410 and may identify one or more network policies, via policy 420.

Assume that data structure 400 includes information that identifies client 110-1 as being allowed to interact with a directory named C:/J.Smith on destination 160-1 (entry 430, FIG. 4). Further assume that client 110-2 is authorized to communicate with destination 160-1 and 160-2 (entry 440, FIG. 4) and that client 110-3 (not shown in FIG. 1) is not authorized to communicate with any devices on private network 130 (entry 450, FIG. 4).

One or more network policies may be transferred to network device 140 using data structure 400 (act 620). For example, an administrator may send data structure 400 from server 150 to network device 140 using private network 130. A network policy may be installed on network device 140, and network device 140 may be configured to implement the network policy against incoming traffic via policy logic 322.

Network device 140 may be placed into a test mode (act 630). For example, an administrator at server 150 may interact with a network management application that can be configured to place network device 140 into a test mode.

Network device 140 may receive traffic from a source (act 640). For example, network device 140 may receive traffic from client 110-1 or 110-2 that is intended for a destination, such as destination 160-1 or 160-2. When network device 140 is placed into test mode, network device 140 may allow traffic to pass through network device 140 to one or more destinations. For example, control logic 320 may implement policy logic 322 and test mode logic 324 when network device 140 is in test mode. When network device 140 operates in a test mode, network policies are implemented but the results of the network policies are not applied to the traffic passing through network device 140. For example, in one testing implementation, network device 140 may allow incoming traffic to pass through network device 140 to an intended destination operating on private network 130 even though the tested policy may indicate that the traffic should be blocked or dropped. Network device 140 may maintain information that indicates how the incoming traffic will be handled by the tested network policies when the polices are turned on in an operational mode.

Network device 140 may create test log 340 when operating against incoming traffic in a test mode (act 650). Assume that network device 140 is operating in a test mode according to a network policy identified in data structure 400. Further assume that network device 140 allows incoming traffic to pass through network device 140 en route to an intended destination operating on private network 130. Network device 140 may generate test log 340 to indicate how incoming traffic was handled in the test mode and/or how incoming traffic will be handled when network device 140 is processing traffic in an operational mode using the tested network policy. For example, network device 140 may populate test log 340 with result 520 that indicates a packet from client 110-1 intended for destination 160-1 was allowed to pass to destination 160-1 in test mode but that the packet will be dropped during normal operation because of a controller timeout. An administrator may evaluate result 520 and may refine a portion of the network policy so as to prevent controller timeouts when client 110-1 attempts to communicate with destination 160-1.

Network device 140 may further populate test log 340 with result 530 that indicates that traffic was allowed to pass through network device 140 in the test mode. Result 530 may indicate that traffic sent from client 110-2 to destination 160-1 will be allowed during normal operation because client 110-2 is authorized to communicate with destination 160-1.

Network device 140 may further populate test log 340 with result 540 that indicates traffic was allowed to pass through network device 140 in test mode. Result 540 may further indicate that client 110-3 is allowed to communicate with server 150 because client 110-3 has administrator privileges. Assume that client 110-3 is associated with an employee that was terminated and that a correct network policy should not let client 110-3 access any devices on private network 130. An administrator may review test log 340 and may determine that result 540 indicates that the tested network policy produces an undesirable outcome (i.e., allows client 110-3 access to server 150) (act 660). The administrator may revise one or more parameters in the tested network policy based on the test results, such as result 540. For example, the administrator may delete client 110-3 from the network policy or may indicate that no destinations on private network 130 are authorized for communication sessions involving client 110-3. An updated network policy may be retested. Retesting may occur until the tested network policy produces desired outcomes.

As described above, a network device may include a "test mode." When placed in test mode, the network device operates substantially as if the network device were operating normally, except that the results of network policies configured for the network device are not actually applied to the traffic passing through the network device. Instead, an indication of the results of the network policies is written to a file, such as a log file.

CONCLUSION

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while the test mode was described in the context of applying to all policies of a device, in some implementations, an administrator may be able to select certain policies for which the test mode is applied. Also, while a series of acts have been described with regard to FIG. 6, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a network device, a first network policy and a second network policy, where the second network policy includes a modification to the first network policy;
   receiving, by the network device, network traffic;
   processing, by the network device, the network traffic according to the first network policy;
   processing, by the network device, the network traffic according to the second network policy;
   based on processing the network traffic according to the second network policy, generating, by the network device, a result that includes information that indicates an effect of the modification to the first network policy on handling, by the network device, of the network traffic;
   based on processing the network traffic according to the first network policy and without applying the second network policy, sending, by the network device, the network traffic to a destination device;
   storing, by the network device, the result; and
   transmitting, by the network device, the result to another network device.

2. The method of claim 1, where processing the traffic according to the second network policy further comprises:
   identifying the destination device based on information in the network traffic.

3. The method of claim 1, further comprising:
   identifying source information in the network traffic; and
   identifying destination information in the network traffic;
   where processing the network traffic according to the second network policy is based on the source information and the destination information.

4. The method of claim 1, where receiving the second network policy further comprises:
   receiving the second network policy from a network management application.

5. The method of claim 1, where generating the result further comprises:
   creating a log file that includes information identifying:
      a source device of the network traffic,
      the destination device, and
      an action the network device would apply to the network traffic according to the second network policy, the source device, and the destination address.

6. The method of claim 1, where receiving the network traffic comprises:
   receiving the network traffic from a device on a private network or connected to the private network via a virtual private network (VPN) tunnel.

7. The method of claim 1, further comprising:
   determining, based on the second network policy, when a source device is authorized to communicate with the destination device.

8. A device, comprising:
   storage to store a first network policy;

a processor to:
  receive a data unit,
  receive a second network policy, where the second network policy includes a modification to the first network policy,
  process the data unit according to the first network policy,
  based on processing the data unit according to the first network policy, identify handling of the data unit according to the first network policy,
  process the data unit according to the second network policy,
  based on processing the data unit according to the second network policy, identify handling of the data unit according to the second network policy, and
  generate a result comprising an effect of the modification on transmission, by the device, of the network traffic, where the result indicate a difference between the handling of the data unit according to the first network policy and the handling of the data unit according to the second network policy; and
a communications interface to:
  forward the result, and
  transmit the data unit to a destination based on the processing of the data unit according to the first network policy and without applying the second network policy.

9. The device of claim 8, where the result includes a log file that comprises information about a source device and a destination device, the source device and the destination device being associated with the data unit.

10. The device of claim 8, where when identifying the handling of the data unit, the processor is further to:
  identify a source device that sent the data unit,
  identify a destination device, and
  determine when the source device is allowed to send the data unit to the destination device, based on the second network policy.

11. The device of claim 8, where when receiving the data unit, the processor is further to:
  receive the data unit over a private network, or
  receive the data unit via a virtual private network (VPN) tunnel over a public network.

12. The device of claim 8, when receiving the network policy, the processor is further to:
  receive the second network policy from a network management application.

13. The device of claim 8, where the communications interface, when forwarding the result, is further to:
  send the result to:
    an administrator,
    a destination device, or
    a network management application.

14. The device of claim 8, where the processor is further to:
  receive an updated second network policy that is generated in response to the result.

15. A device, comprising:
a processor to:
  store first and second policies relating to network traffic received by the device, where the second policy includes a modification to the first policy;
  apply the first policies to the network traffic;
  apply the second policies to the network traffic;
  operate the device in a test mode, where the processor, when operating the device in the test mode is further to:
    produce a result based on applying the second policies to the network traffic, where the result indicates an effect of the modification on handling, by the device, of the network traffic, and
    forward the network traffic based on applying the first policies to the network traffic and without enforcing the second policies upon the network traffic; and
  based on the result, operate the device in an operational mode, where the processor, when operating the device in the operational mode is further to:
  receive additional network traffic,
  compare the result to a particular criteria, and
  enforce, based on comparing the result to the particular criteria, one of the first policies or the second policies upon the additional network traffic when forwarding the additional network traffic.

16. The device of claim 15, where the processor is further to:
  write the result of the test mode to a file.

17. The device of claim 15, where an administrator configures the device to operate in the operational mode or the test mode.

18. The device of claim 15, where the processor is further to:
  identify a source device that sent the network traffic,
  identify a destination device, and
  determine when the source device is allowed to send the additional network traffic to the destination device based on the enforced one of the first policies or the second policies.

19. The device of claim 16, where the processor is further to:
  send the file to an administrator, a destination associated with the network traffic, or a network management application.

20. A device, comprising:
a non-transitory memory storing instructions; and
a processor implementing the instructions to:
  receive a first network policy;
  receive a data unit;
  identify a destination device based on information in the data unit;
  process the data unit based on the first network policy;
  process the data unit based on a second network policy that differs from the first network policy, where the second network policy includes a modification to the first network policy;
  generate a test log that indicates how the data unit will be handled when the second network policy is enforced on the data unit, where the test log includes information associated with an effect of the modification on handling of the data unit;
  send the data unit to the destination device based on the first network policy and without applying the second network policy; and
  send the test log to a device on a network.

* * * * *